(12) United States Patent
Brewster et al.

(10) Patent No.: US 9,102,259 B2
(45) Date of Patent: Aug. 11, 2015

(54) CHAIN WINCH APPARATUS AND METHODS OF USING THE SAME

(71) Applicant: Holland, L.P., Crete, IL (US)

(72) Inventors: John B. Brewster, Homewood, IL (US); Mark B. Eenigenburg, Saint John, IN (US)

(73) Assignee: Holland, L.P., Crete, IL (US)

( * ) Notice: Subject to any disclaimer, the term of this patent is extended or adjusted under 35 U.S.C. 154(b) by 0 days.

(21) Appl. No.: 14/473,753

(22) Filed: Aug. 29, 2014

(65) Prior Publication Data

US 2015/0063937 A1   Mar. 5, 2015

Related U.S. Application Data

(60) Provisional application No. 61/871,679, filed on Aug. 29, 2013.

(51) Int. Cl.
*B60P 7/08* (2006.01)
*F16G 11/12* (2006.01)

(52) U.S. Cl.
CPC ............... *B60P 7/0823* (2013.01); *F16G 11/12* (2013.01)

(58) Field of Classification Search
USPC .......... 410/10, 11, 12, 20, 21, 23, 47, 50, 97, 410/99, 100, 103, 104, 105, 106, 110, 116; 24/68 CT, 265 CD; 254/217, 223, 369; 248/499
See application file for complete search history.

(56) References Cited

U.S. PATENT DOCUMENTS 3,848,889 A * 11/1974 Sharrow ................. 410/103

* cited by examiner

*Primary Examiner* — Stephen Gordon
(74) *Attorney, Agent, or Firm* — Scherrer Patent & Trademark Law, P.C.; Stephen T. Scherrer; Monique A. Morneault

(57) ABSTRACT

The present invention relates to a chain winch apparatus useful for utilizing, for example, as tie-downs for heavy equipment on the decks of railcars, trucks, or other vehicles, although the invention should not be limited to its preferred application. More specifically, the present invention relates to a chain winch apparatus for winching and holding a chain, such as a ½" chain, and for tensioning the chain for the afore-mentioned tie-down applications. Methods of use are further provided.

19 Claims, 3 Drawing Sheets

CHAIN WINCH APPARATUS AND METHODS OF USING THE SAME

The present invention claims priority to U.S. Provisional Patent Application No. 61/871,679, titled, "Chain Winch Apparatus and Methods of Using the Same," filed Aug. 29, 2013, which is incorporated by reference herein in its entirety.

TECHNICAL FIELD

The present invention relates to a chain winch apparatus useful for utilizing, for example, as tie-downs for heavy equipment on the decks of railcars, trucks, or other vehicles, although the invention should not be limited to its preferred application. More specifically, the present invention relates to a chain winch apparatus for winching and holding a chain, such as a ½" chain, and for tensioning the chain for the afore-mentioned tie-down applications. Methods of use are further provided.

BACKGROUND

Winches or tensioners are typically used in tie-down applications for heavy equipment. The transport of heavy equipment, such as military equipment, construction equipment, agricultural equipment, or other like equipment is frequently accomplished over rails, on vehicles such as trucks, via water transport, such as on rivers, canals, and/or seas or oceans. It is typically desirable to ensure that the heavy equipment is securely tied down so that the heavy equipment does not move or shift during transport thereof.

The heavy equipment is further typically positioned on a deck of a transporter, such as the deck of a cargo ship, railcar, truck or other like transporter, and lengths of chain are typically attached to the heavy equipment, or a support frame thereof, and tied down to the deck of the transporter. Frequently, chains of sufficient load-bearing capability are utilized to ensure that the chains securely hold the heavy equipment without breaking.

To ensure that the heavy equipment does not move or shift on the deck of the transporter, the chains may typically be tensioned via tensioners or winches. For example, FIG. 1 illustrates a prior art tensioner 10 that may be attached to a chain for tensioning the chain as it is attached to the heavy equipment. The tensioner 10 may be interconnected to a base 12, that may be disposed within a channel on a deck of a transporter, on a first end 11 thereof and attached to a chain (not shown) on the second end 13 thereof. The tensioner may be twisted around threads 14 on an eyebolt 16 allowing the tensioner to pull the chain (not shown) downwardly toward the base 12, thereby tensioning the chain as it is attached to heavy equipment or another like item.

The tensioner 10, as illustrated in FIG. 1, may have a relatively large load-bearing breaking point, such as up to about 55,000 pounds, for example. However, the tensioner 10 may have a relatively large profile, and may be difficult to utilize in applications where low clearance is provided between the deck and the heavy equipment. Moreover, the tensioning capability is only as long as the eyebolt threaded shaft, so the amount of tensioning in chain distance pull may be limited.

Another prior art tensioning device is illustrated in FIG. 2 of a ⅜" chain winch 20 that may be utilized to tie down heavy equipment as described herein by tying down and winching a chain 22. An end of the chain 22 may be connected to a rotating drum 24 having ratchet teeth 26 disposed on opposite sides of the drum 24. A square socket handle (not shown) may be fit within socket aperture 30 and utilized to turn the drum 24, winching the chain 22. The teeth 26 of the ratchet may engage a U-shaped pawl 28 that may brake the ratchet teeth and prevent movement in the opposite direction.

Typically, the ⅜" chain winch 20 utilized in tie-down applications may be advantageous, compared to the tensioner 10 described above, because of its relatively low profile. Specifically, the entirety of the ⅜" chain winch 20 may be positioned and reside within a channel disposed within the deck of a transporter, such as a railcar, truck, ship or other like transporter, allowing heavy equipment to roll over the same without damaging the chain winch 20. Moreover, the ⅜" chain winch may rotate, providing ease of use and positioning. Typically, however, the ⅜" chain winch 20 as shown in FIG. 2, may have a lower load-bearing breaking point compared to the tensioner 10, described above, such as about 38,000 pounds. Therefore, applications may be limited by its relatively lower strength. Moreover, while chains of larger size, such as even ½" chains, may not fit within the ⅜" chain winch, interfering with the plurality of teeth on either side of the drum as the drum rotates.

A need exists, therefore, for a chain winch apparatus and methods of using the same that may be utilized to tie down heavy equipment. More specifically, a need exists for a chain winch apparatus and methods of using the same that may have sufficient strength so as to be relied upon to consistently tie down heavy equipment without breakage thereof during use.

Moreover, a need exists for a chain winch apparatus and methods of using the same that may be utilized for relatively large sized chains, such as ½" chains, to take advantage of the additional strength provided by the relatively large size chains. In addition, a need exists for a chain winch apparatus and methods of using the same that may provide tensioning functionality without interfering with ratchet teeth within the apparatus.

Further, a need exists for a chain winch apparatus and methods of using the same that may maintain a relatively low profile to not interfere with heavy equipment that may be moved thereover. Still further, a need exists for a chain winch apparatus and methods of using the same that may be contained within existing channels on decks of transporters, yet have a degree of freedom in rotation so that the same may be utilized as needed to tie down heavy equipment.

SUMMARY OF THE INVENTION

The present invention relates to a chain winch apparatus useful for utilizing, for example, as tie-downs for heavy equipment on the decks of railcars, trucks, or other vehicles, although the invention should not be limited to its preferred application. More specifically, the present invention relates to a chain winch apparatus for winching and holding a chain, such as a ½" chain, and for tensioning the chain for the afore-mentioned tie-down applications. Methods of use are further provided.

To this end, in an embodiment of the present invention, a chain winch apparatus is provided. The chain winch apparatus comprises a base and a chain winch housing rotatably connected to the base. Within the chain winch housing may be a pulley for allowing a chain to travel thereunder, and a drum, the drum having, on a first side, a connection point for connecting to the chain, and on an opposite side thereof, a plurality of teeth for engaging a pawl, the drum having an aperture for engaging a means for rotating the drum and pulling the chain through the chain winch housing.

It is, therefore, an advantage and objective of the present invention to provide a chain winch apparatus and methods of using the same that may be utilized to tie down heavy equipment.

More specifically, it is an advantage and objective of the present invention to provide a chain winch apparatus and methods of using the same that may have sufficient strength so as to be relied upon to consistently tie down heavy equipment without breakage thereof during use.

Moreover, it is an advantage and objective of the present invention to provide a chain winch apparatus and methods of using the same that may be utilized for relatively large size chains, such as ½" chains to take advantage of the additional strength provided by the relatively large size chains.

In addition, it is an advantage and objective of the present invention to provide a chain winch apparatus and methods of using the same that may provide tensioning functionality without interfering with ratchet teeth within the apparatus.

Further, it is an advantage and objective of the present invention to provide a chain winch apparatus and methods of using the same that may maintain a relatively low profile to not interfere with heavy equipment that may be moved thereover.

Still further, it is an advantage and objective of the present invention to provide a chain winch apparatus and methods of using the same that may be contained within existing channels on decks of transporters, yet have a degree of freedom in rotation so that the same may be utilized as needed to tie down heavy equipment.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a chain winch apparatus useful for utilizing, for example, as tie-downs for heavy equipment on the decks of railcars, trucks, or other vehicles, although the invention should not be limited to its preferred application. More specifically, the present invention relates to a chain winch apparatus for winching and holding a chain, such as a ½" chain, and for tensioning the chain for the afore-mentioned tie-down applications. Methods of use are further provided.

Figure 3:
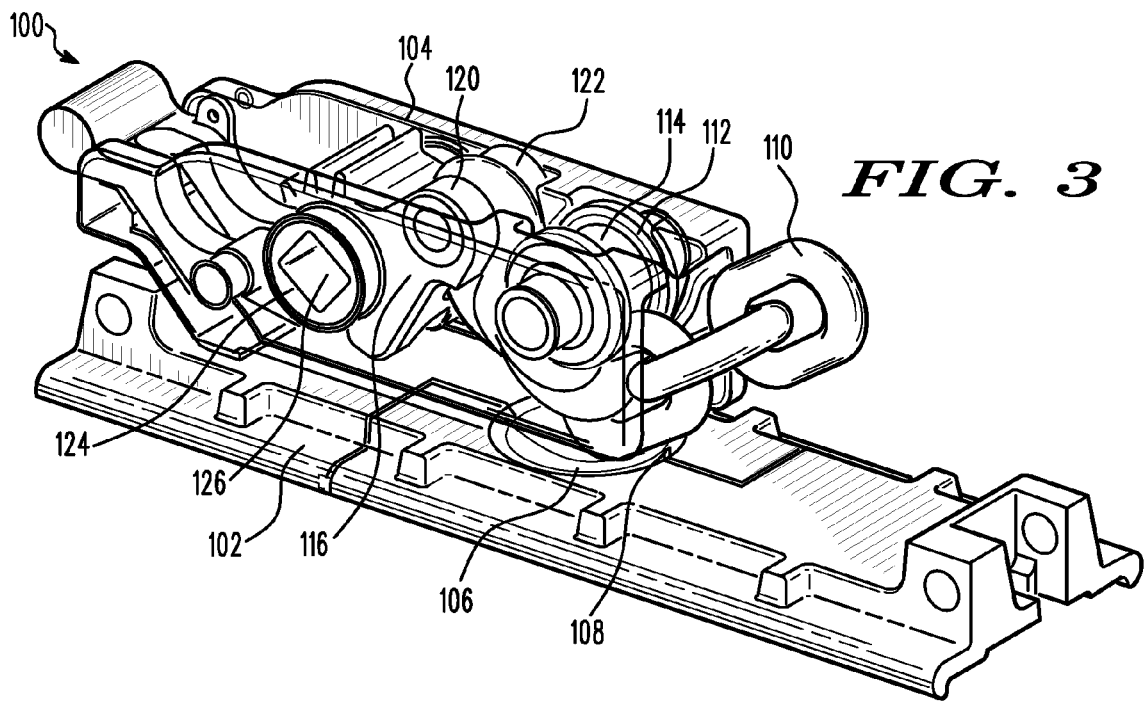
FIG. 3 illustrates a perspective cut-away view of a chain winch in an embodiment of the present invention.

Now referring to the figures, wherein like numerals refer to like parts, FIG. 3 illustrates a perspective cut-away view of a chain winch apparatus 100 in an embodiment of the present invention. Specifically, the chain winch apparatus 100 may comprise a base 102 on which sits a chain winch housing 104. The chain winch housing 104 may have a swivel base 106 that may extend from beneath the chain winch housing 104 and rotatably engage the base 102 via aperture 108. Thus, the chain winch housing 104 may freely and preferably rotate fully 360 degrees with respect to the base 102, allowing the chain winch housing 104 to be disposed in any position useful for positioning a chain 110 that may extend from the chain winch housing 104. The chain 110 may thus be used to help tie down heavy equipment, or for any other purpose, in any direction relative to the base 104.

Preferably, the chain winch apparatus 100 may sit within a channel (not shown) that may be disposed within a deck of a transporter, such as a railcar, a truck bed, a transportation ocean-going ship, or any other vehicle or transporter apparent to one of ordinary skill in the art. Channels typically come in two sizes—having a channel opening that is either 3 3/16 inches wide or 5 ⅝ inches wide, and the chain winch apparatus 100 may be sized to be useful in either channel. Of course, the chain winch apparatus 100 of the present invention may be useful in any size channel, fully disposed therein so as to maintain a relatively low profile so that heavy equipment may roll thereover without damaging the same. It should also be noted that the chain winch apparatus 100 of the present invention may be bolted, welded or otherwise secured directly to a deck of a transporter without being situated within a channel, as apparent to one of ordinary skill in the art.

The chain 110, shown extending from the chain winch housing 104, may extend any distance to tie down heavy equipment. Preferably, the chain 104 may extend a length and be coupled with a second chain or other securement means to attach to heavy equipment or the like. In other words, although FIG. 3 illustrates the chain 110 extending a short distance from the chain housing 104, it is typical that the chain 110 may have several additional links so as to extend a larger distance than shown in FIG. 3.

Chain 110 may be disposed under pulley 112 that may be rotatably attached to sides of the chain winch housing 104, and may freely rotate so that the chain 110 may freely move within the chain winch housing 104 when the chain 110 is winched, as described in more detail below. The pulley 112 may further have a groove 114 therein, sized and positioned for holding the chain 110 therein when traveling under the pulley 112.

Figure 4:
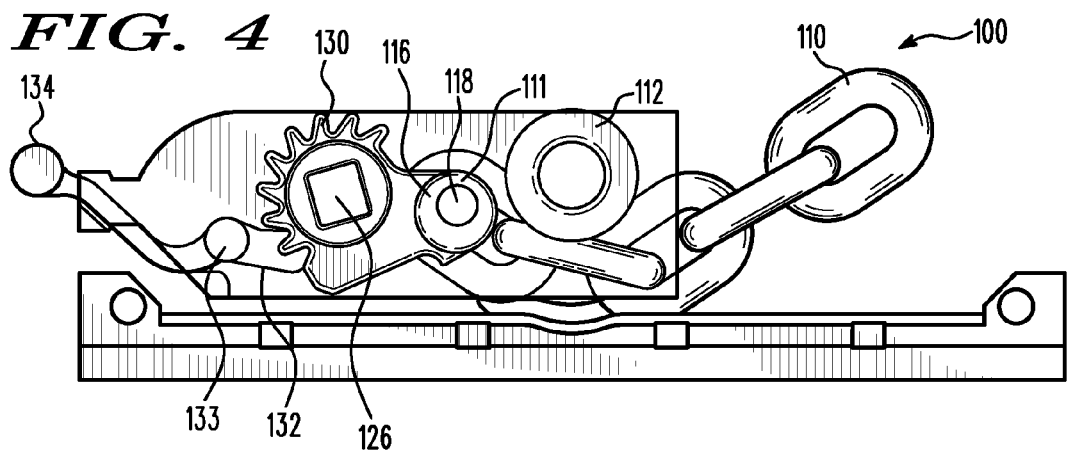
FIG. 4 illustrates a side cut-away view of a chain winch in a first position in an embodiment of the present invention.

As shown in FIGS. 3 and 4, chain 110 may travel under pulley 112 and be connected to arm 116. Specifically arm 116 may engage end link 111 of the chain 110 via lateral post 118 to hold end link 111 engaged to arm 116. Preferably, arm 116 may have an internal space, and arm 116 may have parallel extenders 120, 122, with end link 111 situated between extenders 120, 122 and held in place by lateral post 118 which may extend between extenders 120, 122.

Figure 5:
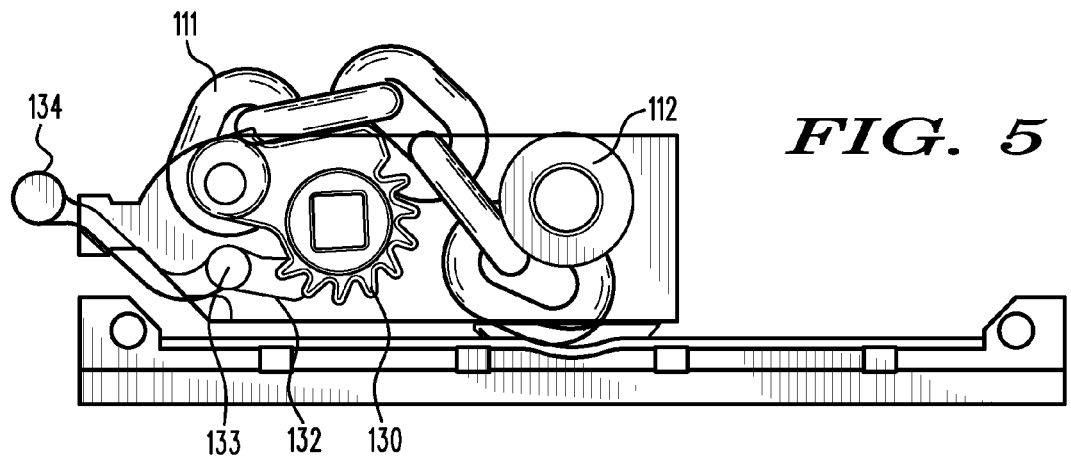
FIG. 5 illustrates a side cut-away view of a chain winch in a second tensioned position in an embodiment of the present invention.

Arm 116 may extend from drum 124 which may be attached on either side to chain winch housing 104 and may rotate therein. Specifically, drum 124 may have an aperture 126 for engaging a socket handle or bar (not shown) for turning the same therewith. A user may thus engage aperture 126 with a socket handle or bar, sized and shaped accordingly, and may turn drum 124. When turned counterclockwise, in the view illustrated in FIG. 4, chain 110 may travel under pulley 112 and end link 111 may travel upwardly and be positioned over drum 124, as illustrated in FIG. 5. When rotated, tension may be increased on chain 110 and slack may be taken up, tightening the chain 110 as it is attached to heavy equipment, thereby tying down the same.

Teeth 130 may be disposed around drum 124 to engage a pawl 132 that may be positioned within chain winch housing. The teeth are preferably positioned on an opposite side of the drum 124 from the arm 126 which may engage the end link 111 of the chain 110. The teeth may extend around a side of the drum, roughly about 180 degrees therearound to provide a plurality of engagement positions with pawl 132. Thus, pawl 132 may engage the teeth 130 at various positions of the drum 124 when rotated and thereby prevent movement of the arm 124 and, thus, the chain 110 in the opposite direction. Pawl 132 may preferably lock the drum 124 and, by extension, the chain 110, into the position desired by the user after rotating the drum 124.

The pawl may have an axis 133 from which a handle 134 may extend therefrom. The handle 134 may be pulled upwardly by a user that desires to unlock the drum and release the chain 110. Specifically, pulling upwardly on the handle 134 may cause the teeth engagement end of the pawl 132 to disengage from the teeth 130, allowing free rotation of the drum 124 in the opposite direction, releasing the chain 110, when desired by a user. When tensioning the chain 110, the handle 134 may be pushed downwardly to engage the pawl 132 with the teeth 130 and prevent movement of the same. In an embodiment, the pawl 132 may be spring-loaded so that a spring (not shown) may bias the pawl 132 toward the teeth 130, thereby ensuring that the pawl 132 maintains engagement with the teeth 130. Pushing the handle 134 against the spring bias may then release the pawl 132 from the teeth 130.

Figure 1:
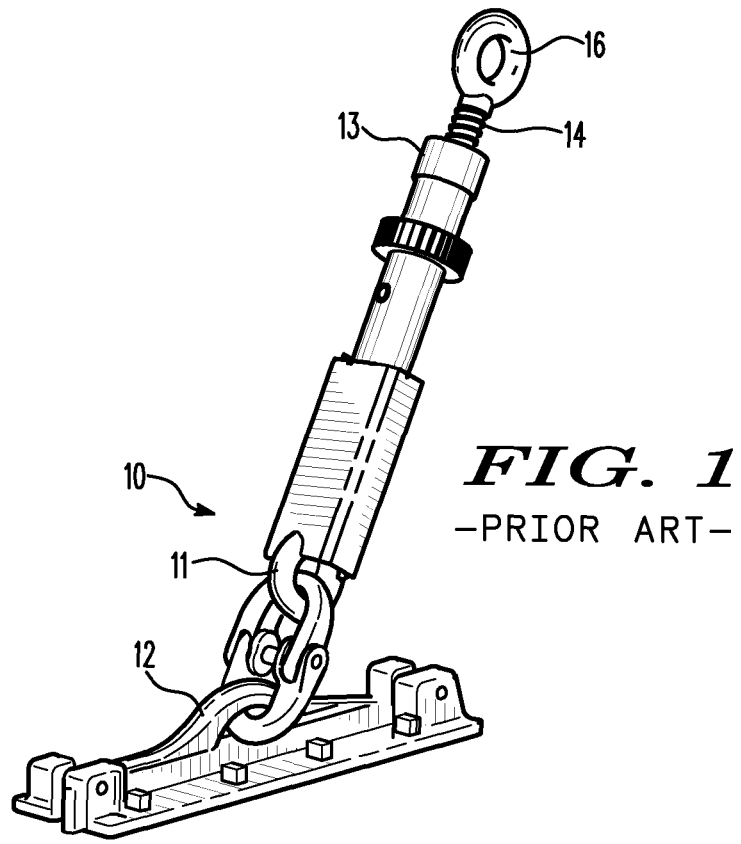
FIG. 1 illustrates a perspective view of a prior art chain tensioner.
Figure 2:
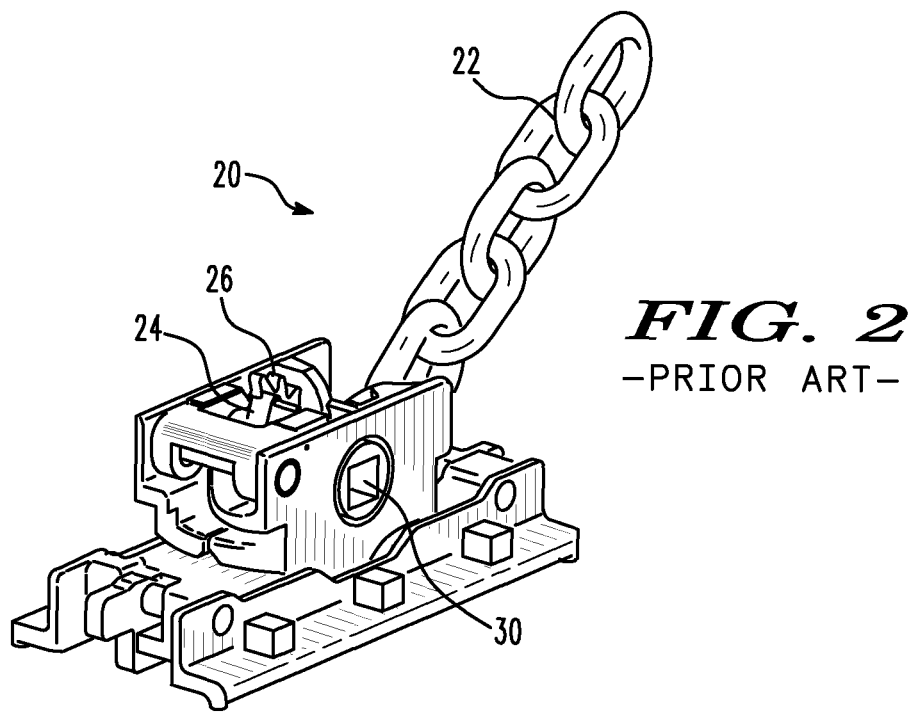
FIG. 2 illustrates a perspective view of a prior art chain winch.

Having the teeth 130 on an opposite side of the drum 124 may allow the teeth to be wider, compared to the chain winch apparatus illustrated in FIG. 2, extending across the surface of the drum 124, thereby maintaining higher strength when tensioning a chain. Ideally, the chain winch apparatus 100 of the present invention has an increased strength compared to known chain winches, such as the chain winch shown in FIG. 2. Preferably, the chain winch apparatus 100 of the present invention may have a strength that is equal to if not superior to the strength of the tensioner 10 illustrated in FIG. 1. Preferably, the chain winch apparatus 100 of the present invention may provide a working load of up to about 13,750 pounds, a proof load of up to about 27,500 pounds, and a breaking strength of about 55,000 pounds, although the present invention should not be limited in strength, as described herein.

The arm 116 extending from the drum 124 with the chain traveling around pulley 112 may increase the travel of the chain as the drum 124 rotates. Preferably, the arm 116 may provide a working angle of travel of the end link 111 through up to about a 45 degree arc. In a preferred embodiment, the chain winch apparatus 100 of the present invention may take up about 5 inches of a ½ inch chain when fully engaged.

Figure 6:
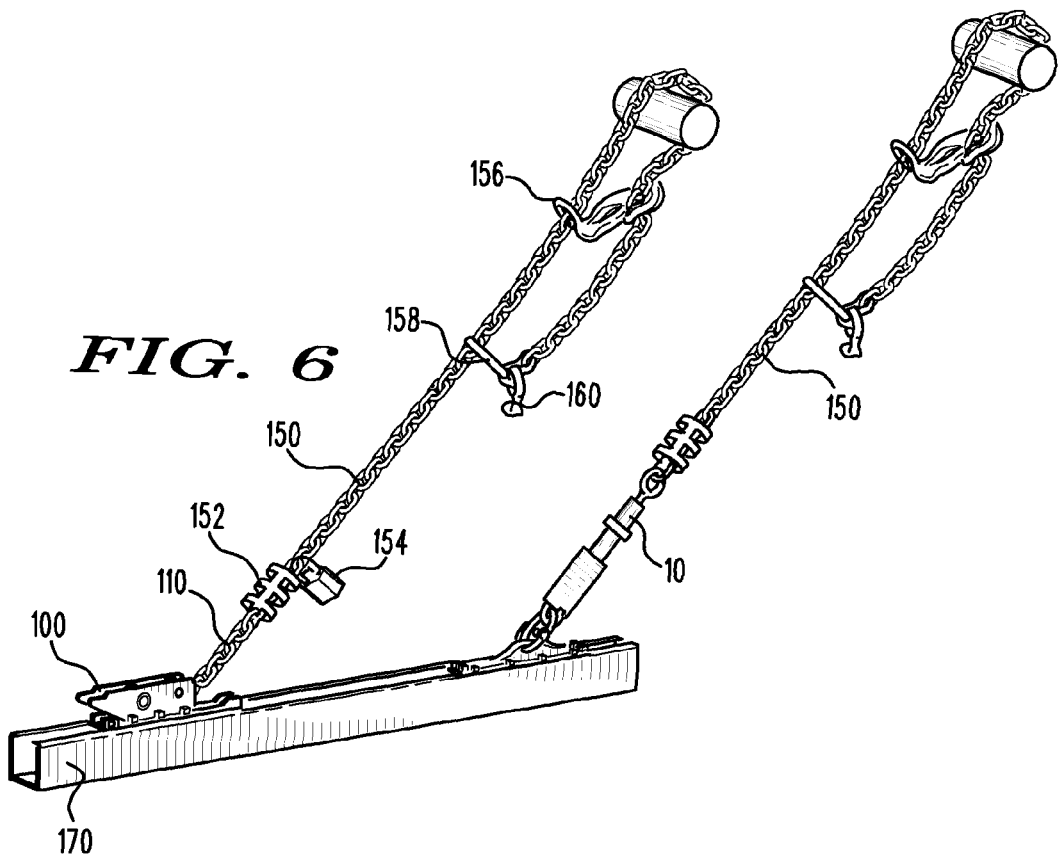
FIG. 6 illustrates a perspective view of a chain winch apparatus in combination with a chain component apparatus of the present invention compared to a prior art tensioner system.
Figure 7:
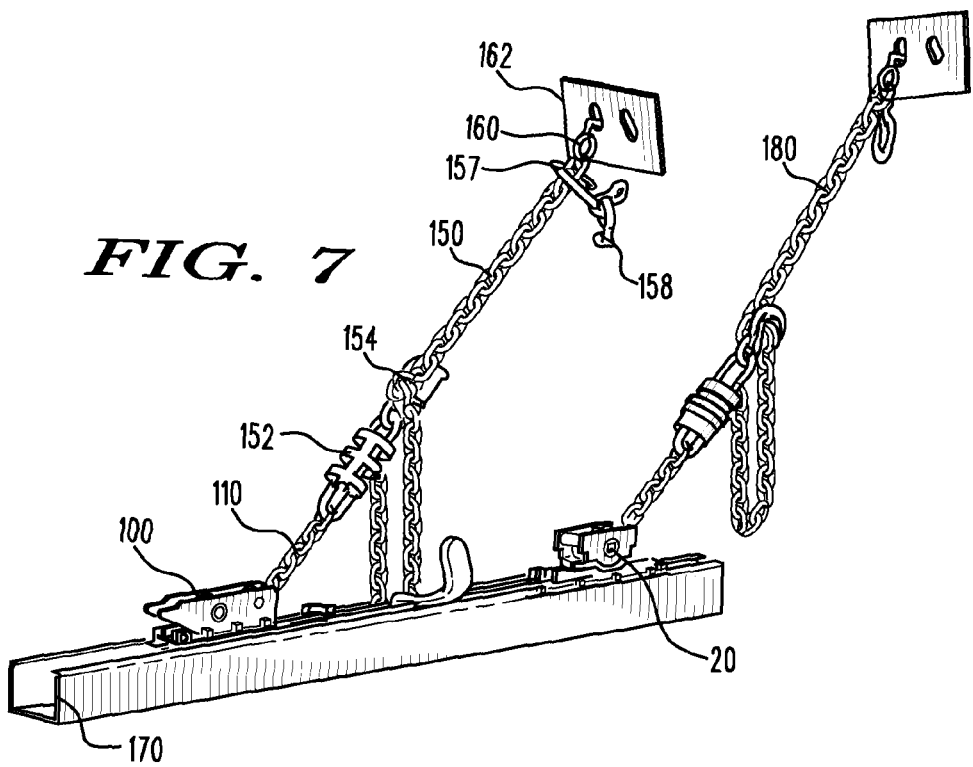
FIG. 7 illustrates a perspective view of a chain winch apparatus in combination with a chain component apparatus of the present invention compared to a prior art ⅜" chain winch apparatus.

FIGS. 6, 7 and 8 illustrate various embodiments of systems utilizing the chain winch apparatus 100 of the present invention in combination with a ½" chain component apparatus 150, and compares the same to prior art chain winch or tensioning systems, as described herein. Specifically, the ½" chain apparatus 150 may include a ½" compression unit 152 which may be utilized to engage an end of the ½" chain that may extend from the chain winch apparatus 100, and may be utilized to tie the ½" chain that extends from the chain winch apparatus to the ½" chain component apparatus 150. Moreover, the ½" chain apparatus may further comprise a claw hook 154 which may be attached to the ½" chain of the chain component apparatus 150, an adjustable grab hook 156, a swivel snap hook 158 with a retaining disk 157 (as illustrated in FIG. 7) and a T-hook 160 on an end thereof. The various components of the chain component apparatus 150 may be utilized in various configurations to aid in tying down heavy equipment or for any other purpose.

Specifically, as illustrated in FIG. 6, the chain winch apparatus 100 may rigidly reside within a channel 170. More specifically, the chain winch apparatus 100 may be held within the channel 170 via projections on the chain winch apparatus 100 that may engage slots within the channel 170 and rigidly hold the chain winch apparatus 100 within the channel 170. The chain 110 that may extend from the chain winch apparatus 100 may be rigidly engaged to the chain component apparatus 150 via the compression unit 152. The chain component apparatus 150 may then wrap around a rod, pole, or other item and then be held together via the adjustable grab hook 156 and/or the swivel snap hook 160, as illustrated in FIG. 6.

Disposed adjacent the chain winch apparatus 100 and the chain component apparatus 150 system is illustrated a tensioner 10 engaged to a ½" chain component apparatus 150. As is illustrated, the tensioner 10 may have a relatively large profile jutting upwardly from the channel 170 when compared to the chain winch apparatus 100 of the present invention.

As illustrated in FIG. 7, a chain winch apparatus 100 may be engaged to a chain component apparatus 150, as described above, in an alternate configuration. Specifically, the chain 110 of the chain winch apparatus 100 may be engaged via compression unit 152 to the ½" chain component apparatus 150. The chain component apparatus 150 may be connected to a plate 162 via the T hook 160 that may be disposed adjacent the retaining disk 157. Extra slack in the chain component apparatus 150 may be taken up by using the claw hook 154 to shorten the chain component apparatus 150, and the extra links in the chain may hang loosely, as illustrated in FIG. 8.

Adjacent the chain winch apparatus 100 and chain component apparatus 150 system is illustrated a ⅜" chain winch apparatus 20 that may connect to a ⅜" chain component apparatus 180 in a similar manner as described above with respect to the chain winch apparatus 100. However, because the chain winch apparatus 20 may only engage ⅜" chain, the strength of the system is necessarily weaker than the chain winch apparatus 100 and ½" chain component apparatus 150 system, described above.

It should be apparent from the figures herein that the chain winch apparatus 100, as described herein, may be utilized as a replacement for both the tensioner 10 and the ⅜" inch chain winch apparatus 20 in applications for tying down heavy equipment or for any other purpose.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A chain winch apparatus comprising:
   a chain having an end link; and
   a base and a chain winch housing connected to the base, wherein within the chain winch housing is a pulley for allowing the chain to travel thereunder, and a drum, the drum having, on a first side, a connection point for connecting to the chain, and on an opposite side thereof, a plurality of teeth for engaging a pawl, the drum rotatable for pulling the chain through the chain winch housing under the pulley, the end link of the chain connected to the drum at the connection point, the chain running in contact with the pulley between the pulley and the base from a first side of the pulley to a second side of the pulley, and extending at an angle away from the base on the second side of the pulley.

2. The chain winch apparatus of claim 1 further comprising:
   a pawl pivotally connected to the housing, the pawl having a handle end and a teeth engagement end, said teeth engagement end shaped to engage at least one of the teeth on the drum.

3. The chain winch apparatus of claim 2 wherein the pawl further comprises an axis between the handle end and the teeth engagement end for pivoting the pawl when the handle end is moved.

4. The chain winch apparatus of claim 1 wherein the teeth on the drum extend about 180 degrees around the circumference of the drum.

5. The chain winch apparatus of claim 1 wherein the housing is rotatably attached to the base.

6. The chain winch apparatus of claim 5 wherein the housing is rotatable 360 degrees on the base.

7. The chain winch apparatus of claim 1 wherein the drum further comprises an arm extending from the drum, the connection point for the chain disposed on an end of the arm.

8. The chain winch apparatus of claim 1 further comprising:
   a tool for engaging the drum to rotate the drum, wherein rotating the drum in a first direction causes the chain to rotate about the drum and travel between the pulley and the base.

9. The chain winch apparatus of claim 8 wherein rotating the drum further causes one of the teeth on the drum to engage the pawl preventing the drum from rotating in a second direction.

10. A method of tying an article to a transportation deck comprising the steps of:
    providing a deck on which an article is disposed for transport;
    providing a chain winch apparatus connected to the deck and a chain extending from the chain winch apparatus, the chain having an end link, the chain winch apparatus comprising a base and a chain winch housing connected to the base, wherein within the chain winch housing is a pulley for allowing the chain to travel thereunder, and a drum, the drum having, on a first side, a connection point connected to the end link of the chain, and on an opposite side thereof, a plurality of teeth engaging a pawl, the drum rotatable for pulling the chain through the chain winch housing under the pulley, the chain running in contact with the pulley from a first side of the pulley to a second side of the pulley and disposed between the pulley and the base, the chain further extending at an angle away from the base on the second side of the pulley;
    connecting the chain to the article on the deck;
    rotating the drum in a first direction, whereby rotating the drum causes the chain to rotate about the drum and travel in contact with the pulley between the pulley and the base; and
    engaging one of the teeth with the pawl to prevent movement of the drum in a second direction.

11. The method of claim 10 wherein the pawl is pivotally connected to the housing, the pawl having a handle end and a teeth engagement end, said teeth engagement end shaped to engage at least one of the teeth on the drum.

12. The method of claim 11 wherein the pawl further comprises an axis between the handle end and the teeth engagement end for pivoting the pawl when the handle end is moved, and further comprising the step of:
    moving the pawl about the axis to disengage the teeth engagement end from the tooth on the drum.

13. The method of claim 10 wherein the teeth on the drum extend about 180 degrees around the circumference of the drum.

14. The method of claim 10 wherein the housing is rotatably attached to the base, and further comprising the step of:
    rotating the housing for positioning of the chain on the article.

15. The method of claim 14 wherein the housing is rotatable 360 degrees on the base.

16. The method of claim 10 wherein the drum further comprises an arm extending from the drum, the connection point for the chain on an end of the arm.

17. The method of claim 10 wherein the drum comprises an aperture for engaging a tool for rotating the drum, further comprising the steps of:
    providing a tool for engaging the aperture in the drum;
    placing the tool in the aperture; and
    rotating the drum with the tool.

18. The method of claim 10 further comprising the step of:
    moving a handle end of the pawl to disengage the pawl from the tooth on the drum, allowing free rotation of the drum in the second direction.

19. The method of claim 10 wherein the chain winch apparatus resides within a channel on the deck.

* * * * *